(12) United States Patent
Kejha et al.

(10) Patent No.: US 6,326,105 B1
(45) Date of Patent: Dec. 4, 2001

(54) COMPOSITE POLYMER ELECTROLYTES FOR ALKALI METAL ELECTROCHEMICAL DEVICES WHICH CONTAIN A NON-WOVEN GLASS FIBER NET

(75) Inventors: Joseph B. Kejha, Meadowbrook; Santha Kolla, Morton; Jay Forlino, Landenberg, all of PA (US)

(73) Assignee: Lithium Technology Corporation, Plymouth Meeting, PA (US)

( * ) Notice: Subject to any disclaimer, the term of this patent is extended or adjusted under 35 U.S.C. 154(b) by 0 days.

(21) Appl. No.: 09/596,885

(22) Filed: Jun. 20, 2000

Related U.S. Application Data

(63) Continuation-in-part of application No. 09/096,835, filed on Jun. 12, 1998, now Pat. No. 6,080,511.

(51) Int. Cl.$^7$ ...................................................... H01M 6/14
(52) U.S. Cl. ........................ 429/303; 429/300; 429/306; 429/307; 429/310; 429/311; 429/321; 429/322; 429/323; 429/324; 429/336; 429/338; 252/62.2
(58) Field of Search .................................... 429/300, 303, 429/306, 307, 310, 311, 324, 336, 338, 321, 322, 323; 252/62.2

(56) References Cited

U.S. PATENT DOCUMENTS

| | | | |
|---|---|---|---|
| 5,521,023 | * | 5/1996 | Kejha et al. .......................... 429/300 |
| 5,529,707 | * | 6/1996 | Kejha ................................... 252/62.2 |
| 5,705,084 | * | 1/1998 | Kejha ................................... 252/62.2 |
| 5,750,289 | * | 5/1998 | Kejha ................................... 429/233 |
| 5,925,283 | | 7/1999 | Taniuchi et al. ..................... 252/62.2 |
| 5,925,483 | * | 7/1999 | Kejha et al. .......................... 429/303 |

* cited by examiner

Primary Examiner—Bruce F. Bell
(74) Attorney, Agent, or Firm—Drinker Biddle & Reath LLP

(57) ABSTRACT

Polymer electrolyte composites for alkali metal electrochemical devices which are formed by coating an inert, lightweight, electrically insulating, non-woven glass fiber net which includes a polyvinyl alcohol binder, with a liquid polymer which may be ionically conductive, and curing the polymer to form a solid or semi-solid state electrolyte composite.

17 Claims, 1 Drawing Sheet

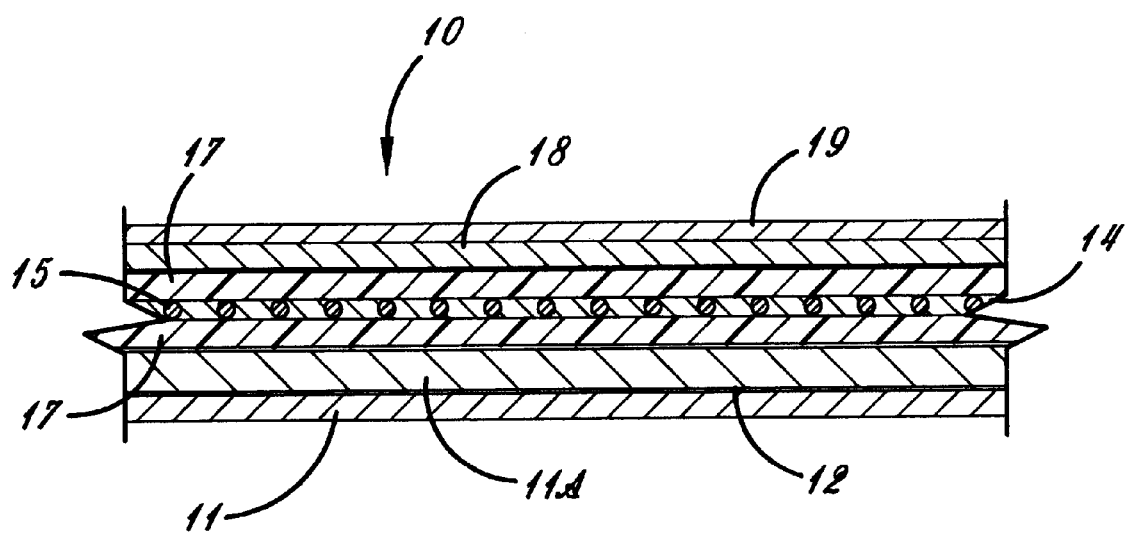
Fig.

COMPOSITE POLYMER ELECTROLYTES FOR ALKALI METAL ELECTROCHEMICAL DEVICES WHICH CONTAIN A NON-WOVEN GLASS FIBER NET

CROSS REFERENCE TO RELATED APPLICATIONS

This application is a continuation-in-part of the prior application of Joseph B. Kejha, Ser. No. 09/096,835, filed Jun. 12, 1998, now U.S. Pat. No. 6,080,511, entitled, COMPOSITE POLYMER ELECTROLYTES FOR ALKALI METAL ELECTROCHEMICAL DEVICES WHICH CONTAIN A GLASS FIBER NET.

BACKGROUND OF THE INVENTION

1. Field of the Invention

This invention relates to solid and semi-solid state polymer electrolyte composites which contain an inert electrically insulating non-woven glass fiber net, which is coated with an ion conductive solid or semi-solid state matrix.

DESCRIPTION OF THE PRIOR ART

In the prior art various polymers have been used as components of the electrolytes of solid state alkali metal, and alkaline earth metal batteries, and various other kinds of electrochemical devices.

Among the problems associated with the use of these polymers in electrolytes is that they have inherent relatively low ionic conductivity, and are not tough enough to prevent shorting during assembly or use.

Various solutions have been proposed such as described in the U.S. Pat. Nos. to Hope et al., 5,102,752; 5,328,558; Schwabet et al., 4,792,504; Ballard et al., 4,822,701; Bauer et al., 4,654,279; Lee et al., 4,830,939; Lee et al., 4,990,413, Kejha 5,521,023, and Taniuchi et al. 5,925,283.

Some of the prior art polymer containing electrolytes also have exhibited poor adherence to the electrodes, are not flexible and do not possess sufficient mechanical strength to prevent shorting under pressure, or punching through of dendrites and consequent shorting of the device.

While electrically insulating fibrous structures in solid ribbon or mesh form are used in composite electrolytes, and are satisfactory for their intended purpose, these prior art fibrous non-woven fabrics are thick, heavy, bulky, may absorb moisture, and may also cost more than is optimal. None of the prior art patents suggests, discloses or describes the composite electrolytes described herein.

The composite polymer electrolytes of the invention do not suffer from the prior art problems and provide many positive advantages.

SUMMARY OF THE INVENTION

It has now been found that, solid or semi-solid state electrolytes which are highly ion conductive, have low resistance, are shorting-proof, dendrite-proof, flexible yet mechanically strong, lightweight, and inert to component materials, can be made by using a composite construction, where an electrically insulating material, preferably a net of non-porous non-woven glass fibers, which includes a polyvinyl alcohol binder, and is coated with a liquid polymer material, which is solidified by cooling, or evaporation, or cross linking, or radiation to form a solid state matrix, which may be ionically conductive.

The principal object of the invention is to provide solid or semi-solid state composite polymer electrolytes for batteries, capacitors and other electrochemical devices, which include an electrically insulating net of non-porous non-woven glass fibers embedded in an ionically conductive matrix.

A further object of the invention is to provide composite electrolytes of the character aforesaid that are of low cost, and are inert to the component materials used in various electrochemical devices.

A further object of the invention is to provide composite electrolytes of the character aforesaid that have excellent adherence and low shrinkage properties, as well as contributing to greater cycle life and capacity retention of the devices.

A further object of the invention is to provide composite electrolytes of the character aforesaid, that are flexible, tough, easy to handle, and lend themselves to mass production.

A further object of the invention is to provide composite electrolytes of the character aforesaid that are lightweight, mechanically strong, and resist shorting under pressure.

A further object of the invention is to provide composite electrolytes of the character aforesaid that are non-reactive with the devices compositions, are highly stable at elevated temperatures, and allow rapid processing.

A further object of the invention is to provide composite electrolytes of the character aforesaid, wherein the electrically insulating component does not curl, resists shrinkage, and does not absorb moisture.

A further object of the invention is to provide composite electrolytes of the character aforesaid wherein the electrically insulating component can be dip coated, or coated by other means, or pressed under heat into a polymer electrolyte film.

Other objects and advantageous features of the invention will be apparent from the description and claims.

BRIEF DESCRIPTION OF THE DRAWING

The nature and characteristic features of the invention will be more readily understood from the following description taken in connection with the accompanying drawing forming part hereof in which:

The FIGURE is a diagrammatic view of an electrochemical device, such as a battery constructed in accordance with the invention.

It should of course be understood that the description and drawing herein are merely illustrative and that various modifications and changes can be made in the structure disclosed without departing from the spirit of the invention.

DESCRIPTION OF THE PREFERRED EMBODIMENTS

When referring to the preferred embodiments certain terminology will be utilized for the sake of clarity. Use of such terminology is intended to encompass not only the described embodiments, but also technical equivalents which operate and function in substantially the same way to bring about the same result.

Electrochemical devices such as alkali or alkaline earth metal batteries, and for example lithium batteries, consist of at least an anode layer, a polymer electrolyte layer, and a cathode layer. Such devices can be of virtually any desired size and configuration, and usually include additional layers such as current conducting backing layers, insulating layers and electrode connection layers.

The polymer dielectric or electrolyte layer must be compatible with the component materials used to fabricate the devices while possessing suitable ionic conductivity.

It is also desirable to reduce the weight of the finished device and the cost.

Referring now more particularly to the drawing the electrochemical device described herein, which is illustrated, is a battery 10 of the lithium-ion polymer type, which has a base 11, which includes a web of material 11A, such as aluminum foil or a ribbon of expanded or perforated foil or metallized plastic film coated with a cathode material 12.

The cathode material 12 is of well known type, and may include finely ground particles of an intercalation compound such as lithiated cobalt oxide ($LiCoO_2$), mixed with an organic solvent, polymer, alkali metal salt, and carbon black.

The cathode material 12 may have an additional layer 14 of solid state polymeric electrolyte composite applied thereto, which composite may include an electrically non-conductive non-woven glass fiber net which is inert to the battery components.

The non-woven glass fiber net includes a polyvinyl alcohol binder of well known type, which results in a substantial reduction in the resistance of the electrochemical devices, optimally the net is plasma treated to remove impurities. The plasma used for treatment is preferably oxygen plasma. Alternatively the net may be washed in deionized water, and a solvent such as acetone, and then dried in well known manner, such as by vacuum drying. In addition, for certain applications, it may be desirable to plasma treat the net, and also to wash it as described.

The net 15 is preferably dip coated with polymeric material 17, such as an alloy of polyvinyldiene fluoride and polyethylene oxide based material, such as described in the prior U.S. Pat. No. of Joseph B. Kejha, 5,705,084.

An additional layer 18 of well known anode material such as carbon graphite mixed with organic solvent, polymer, alkali metal salt and carbon black is applied on top of the electrolyte layer and includes a web of material 19, such as copper foil, or expanded copper foil, or perforated metallized plastic film.

The resultant battery can be provided with other layers as desired.

It should be noted that the glass fiber net is of lighter weight than a corresponding length of plastic film or fabric material, and that the glass fibers are non-porous.

A solid state polymeric electrolyte composition which is suitable, for example, for lithium-ion batteries, capacitors, electrochromic devices, sensors, fuel cells, memory devices, and devices for brine electrolysis by an ion exchange method, contains PVDF and PEO, or PVDF/HFP and PEO, at least one aprotic liquid and at least one salt.

Aprotic liquids may be esters like ethylene carbonate, propylene carbonate, dimethyl carbonate, butylene carbonate, diethyl carbonate, methyl-ethyl carbonate or other esters or ethers like dimethoxyethane, tetrahydrofuran, dimethoxypropane, or other ethers, or mixtures of these liquids. The salts may preferably be alkali metal salts, such as lithium triflate, lithium perchlorate, lithium hexafluorophosphate, lithium hexafluorarsenate, lithium tetrafluorborate, or other salts, or mixture thereof.

If a radiation curable polymer is used, the impregnated composite is irradiated by UV light, or electron beam radiation before cooling as described in U.S. Pat. No. 5,006,531.

It should be noted that, for other electromechanical devices, the lithium triflate salt should be replaced by a corresponding triflate salt to match the elected alkali or alkaline earth metal.

Preferred embodiments of the invention are illustrated in the following examples:

EXAMPLE #1

A sample of a polymer electrolyte for electrochemical devices was formed by compounding the following which contained:

1. 56 g THF (tetrahydrofuran)
2. 6.5 g DMC (dimethyl carbonate)
3. 3.29 g EC (ethylene carbonate)
4. 1.29 g lithium triflate
5. 0.5 g PVDF (polyvinyldienefluoride) (homopolymer)
6. 1.2 g PEO (polyethylene oxide)

The mixture was heated to 60° C. during mixing with a magnetic stirrer in a closed bottle to dissolve the PVDF and PEO. It was then cooled to room temperature and remained in a liquid state.

A length of glass fiber net was dipped into the liquid. The coated net was applied to an electrode layer. After coating the THF solvent substantially evaporated, which resulted in a tough ionically conductive composite film layer, which was soaked with an aprotic liquid such as DMC which does not dissolve it, and which further improves its ionic conductivity.

EXAMPLE #2

Another sample of a polymer alloy electrolyte for electrochemical devices was formed by compounding the following:

1. 27 g DMC (dimethyl carbonate)
2. 13 g EC (ethylene carbonate)
3. 5 g lithium perchlorate
4. 6.5 g PVDF/HFP (polyvinyldienefluoridehexafluoropropylene copolymer)
5. 1.0 g PEO (polyethylene oxide)

The mixture was heated to 90° C. during mixing with a magnetic stirrer in a closed bottle to dissolve the PVDF and PEO.

A length of glass fiber net was coated with the hot mixture. The hot coated net was applied to a lithiated cobalt oxide electrode layer. The composite electrolyte was then cooled to 27° C. or less and after partial evaporation of the DMC a solid of semi-solid ion conductive composite layer of desired thickness, strength and adherence was formed. A second carbon based electrode was added.

The resultant cell was sealed in a moisture proof bag, and was rechargeable.

It is thus apparent that compositions have been described with which the objects of the invention are achieved.

We claim:

1. A solid or semi-solid state polymer electrolyte composite for alkali metal-ion electrochemical devices wherein the electrolyte composite comprises an electrically insulating length of non-woven glass fiber net which has been coated with and is embedded in an tonically conductive solid or semi-solid state matrix, and said non-woven net includes a polyvinyl alcohol binder.

2. A solid or semi-solid state polymer electrolyte composite for alkali metal-ion electrochemical devices wherein the electrolyte composite comprises an electrically insulating length of non-woven glass fiber net which has been coated with and is embedded in an ionically conductive solid or semi-solid state matrix, said non-woven net includes a polyvinyl alcohol binder, and said solid or semi-solid state matrix is formed from an ion conductive liquid which has been solidified by cooling.

3. A solid or semi-solid state polymer electrolyte composite for alkali metal-ion electrochemical devices wherein the electrolyte composite comprises an electrically insulating length of non-woven glass fiber net which has been coated with and is embedded in an ionically conductive solid or semi-solid state matrix, said non-woven net includes a polyvinyl alcohol binder, and said solid or semi-solid state matrix is formed from an ion conductive liquid which has been solidified by cooling and evaporation.

4. A solid or semi-solid state polymer electrolyte composite for alkali metal-ion electrochemical devices wherein the electrolyte composite comprises an electrically insulating length of non-woven glass fiber net which has been coated with and is embedded in an ionically conductive solid or semi-solid state matrix, said non-woven net includes a polyvinyl alcohol binder, and said solid or semi-solid state matrix is formed from an ion conductive liquid which has been solidified by evaporation.

5. A solid or semi-solid state polymer electrolyte composite for alkali metal-ion electrochemical devices wherein the electrolyte composite comprises an electrically insulating length of non-woven glass fiber net which has been coated with and is embedded in an ionically conductive solid or semi-solid state matrix, said non-woven net contains a polyvinyl alcohol binder, said solid or semi-solid state matrix is formed from a polymeric liquid which has been solidified, and said matrix contains at least one aprotic liquid and at least one salt.

6. A composite as defined in claims 1 or 2 or 3 or 4 or 5 in which said non-woven net is plasma treated.

7. A composite as defined in claim 6 in which said plasma is oxygen plasma.

8. A composite as defined in claims 1 or 2 or 3 or 4 or 5 in which said non-woven net is washed in deionized water and acetone, and then dried.

9. A composite as defined in claims 1 or 2 or 3 or 4 or 5 in which said non-woven net is plasma treated, washed in deionized water and acetone, and then dried.

10. A composite as defined in claim 5 in which said aprotic liquid contains butylene carbonate.

11. A composite as defined in claim 5 in which said aprotic liquid contains propylene carbonate.

12. A composite as defined in claim 5 in which said aprotic liquid contains ethylene carbonate.

13. A composite as defined in claim 5 in which said aprotic liquid contains at least one ester.

14. A composite as defined in claim 5 in which said aprotic liquid contains dimethyl carbonate.

15. A composite as defined in claim 5 in which said aprotic liquid contains diethyl carbonate.

16. A composite as defined in claim 5 which contains lithium hexafluorophosphate salt.

17. A composite as defined in claim 5 in which said aprotic liquid contains lithium tetrafluoroborate salt.

* * * * *